Figure 1:
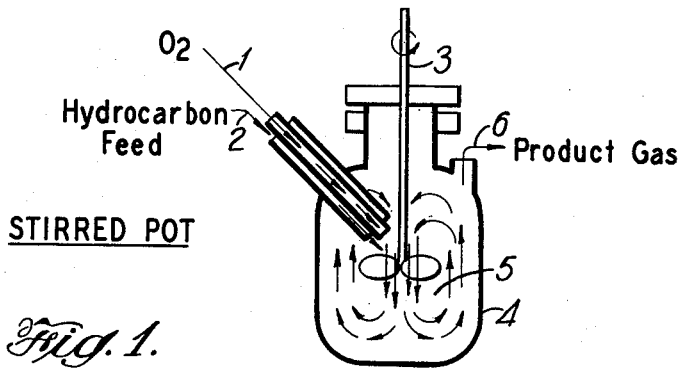

May 5, 1964

R. C. LEMON ETAL 3,132,156

SELECTIVE NON-CATALYTIC, VAPOR PHASE OXIDATION
OF SATURATED ALIPHATIC HYDROCARBONS
TO OLEFIN OXIDES

Filed Nov. 1, 1960

6 Sheets-Sheet 1

INVENTORS
PHILIP C. JOHNSON
RUSSEL C. LEMON
JOZSEF M. BERTY

BY *George A. Sipaoli*
ATTORNEY

INVENTORS
PHILIP C. JOHNSON
RUSSEL C. LEMON
JOZSEF M. BERTY

BY George A. Depaoli
ATTORNEY

May 5, 1964

R. C. LEMON ET AL 3,132,156

SELECTIVE NON-CATALYTIC, VAPOR PHASE OXIDATION
OF SATURATED ALIPHATIC HYDROCARBONS
TO OLEFIN OXIDES

Filed Nov. 1, 1960

6 Sheets-Sheet 3

INVENTORS
PHILIP C. JOHNSON
RUSSEL C. LEMON
JOZSEF M. BERTY

BY *George a. Depadi*
ATTORNEY

INVENTORS
PHILIP C. JOHNSON
RUSSEL C. LEMON
JOZSEF M. BERTY
BY George A. Depaoli
ATTORNEY May 5, 1964 — R. C. LEMON ETAL — 3,132,156
SELECTIVE NON-CATALYTIC, VAPOR PHASE OXIDATION
OF SATURATED ALIPHATIC HYDROCARBONS
TO OLEFIN OXIDES
Filed Nov. 1, 1960 — 6 Sheets-Sheet 5

INVENTORS
PHILIP C. JOHNSON
RUSSEL C. LEMON
JOZSEF M. BERTY
BY George A. Depadi
ATTORNEY

INVENTORS
PHILIP C. JOHNSON
RUSSEL C. LEMON
JOZSEF M. BERTY

BY George A. Depaoli
ATTORNEY

United States Patent Office 3,132,156
Patented May 5, 1964

3,132,156
SELECTIVE NON-CATALYTIC, VAPOR PHASE OXIDATION OF SATURATED ALIPHATIC HYDROCARBONS TO OLEFIN OXIDES
Russel C. Lemon, Scott Depot, Philip C. Johnson, St. Albans, and Jozsef M. Berty, Charleston, W. Va., assignors to Union Carbide Corporation, a corporation of New York
Filed Nov. 1, 1960, Ser. No. 66,469
12 Claims. (Cl. 260—348)

This invention relates to the non-catalytic, vapor phase oxidation of saturated, aliphatic hydrocarbons containing from 2 through 4 carbon atoms and has, for one of its principal objects, the provision of an improved process for the production of propylene oxide from propane.

Alkylene oxides (vicinal epoxy alkanes), and particularly propylene oxide, are very valuable and widely used chemicals. They have been polymerized with a wide variety of monomers to yield polymers which have been useful in coating compositions and in the manufacture of molded articles. Alkylene oxides have also been reacted with alcohols to yield monoalkyl ethers which have utility as solvents in many commercial processes and which are useful as components for synthetic turboprop and turbojet lubricants.

There are many methods known in the art for the production of alkylene oxides and particularly, propylene oxide. One of the oldest methods is the so-called "chlorohydrin process" which involves the reaction of chlorine and water to form hypochlorous acid which is then reacted with propylene to form propylene chlorohydrin. The propylene chlorohydrin is then dehydrohalogenated to yield propylene oxide. Another method to obtain propylene oxide is by the liquid phase oxidation of propylene with organic peracids.

The reactions, involved in the aforementioned methods are specific and although substantially only the desired product is produced, there are serious disadvantages associated therewith. The "chlorohydrin process" suffers from the disadvantage of forming by-products which increase the cost of operation and necessitate elaborate, expensive and time-consuming separation techniques. Additionally, the raw materials, chlorine and propylene are relatively expensive and the corrosive nature of chlorine requires special and expensive equipment. The oxidation of propylene with peracids is a potentially dangerous operation and expensive equipment is needed to guard against the hazards of the peracids. Another disadvantage of this method is the high cost of peracids.

Another method which has received considerable attention in the literature is the direct oxidation of hydrocarbons with an oxygen-containing gas. This method suffers from one serious disadvantage in that it is not specific for the production of alkylene oxides but produces a variety of other compounds including acids, esters, ethers and oxides of carbon including carbon monoxide and carbon dioxide. The reaction does, however, possess two attributes which recommend it highly for commercial utilization, i.e., inexpensiveness of starting materials and simplicity of operation. It is primarily for these reasons that much of the attention in recent years has been directed to improvements in methods for the production of alkylene oxides from the air oxidation of hydrocarbons even though the producer must necessarily contend with the concurrent production of a variety of undesired products.

With the advent of methods for the production of alkylene oxides by the direct air oxidation of hydrocarbons, particular emphasis has been placed upon the maximization of oxide yield and the minimization of yields of other products of the reaction.

In order to facilitate further understanding of the problems involved in the air oxidation of hydrocarbons as well as the improved method of this invention, references will be had hereinafter to propylene oxide made from propane. It is to be understood however, that the principles set forth are generally applicable to saturated aliphatic hydrocarbons containing from 2 through 4 carbon atoms, as pointed out above.

The difficulty in arriving at a method which is highly selective for the production of propylene oxide can be illustrated by an oversimplification of the reactions which occur when propane is oxidized in the presence of oxygen or an oxygen-containing gas. For the purpose of this explanation it can be assumed that propane undergoes the following competing reactions:

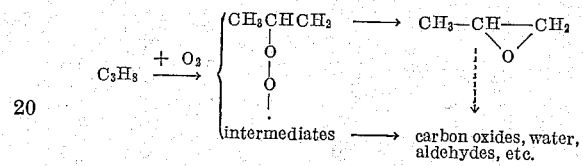

One reaction involves the formation of propylene oxide while another reaction involves the formation of intermediates other than propylene oxide and simultaneously therewith still another reaction involves the degradation of propylene oxide previously formed. Since the oxidation is highly exothermic and self-accelerating, the direction of the oxidation to a partially oxidized product such as propylene oxide presents many problems.

The prior art methods which attempted to produce propylene oxide by the oxidation of propane were only partially successful. The majority of the prior art methods used conventional vertical columns and differed from each other by variations in lengths and diameter of the column, temperature, pressure, etc. However, all of these methods suffered one common disadvantage—the temperature and the concentration of the reactants varied throughout the length of the column.

The temperature variations are easily explained since the oxidation reactions are exothermic and the heat evolved differs with each reaction which is taking place. These prior art methods necessitated the use of elaborate and expensive cooling apparatus which, unfortunately, could not provide a uniform temperature. Thus, at various increments along the tube, conditions existed which favored the direction of the oxidation to products other than propylene oxide.

Additionally, the concentration of reactants varied throughout the length of the tube due to the fact that oxidation takes place at each point in the tube in various ways and in various rates.

Thus, it is the primary purpose of this invention to provide a method for the production of good yields of an alkylene oxide from the oxidation of a saturated aliphatic hydrocarbon containing from 2 through 4 carbon atoms with oxygen or an oxygen-containing gas.

It is another object of this invention to provide a method for the direction of the oxidation of propane to propylene oxide which is efficient, simple, and provides good yields of propylene oxide and is cheaper to install, maintain and operate.

It is still another object of this invention to provide a method for the oxidation of propane which maximizes the yields of propylene oxide and minimizes the yields of unwanted by-products.

It has now been discovered that the above-mentioned objects can finally be attained by oxidizing saturated, aliphatic hydrocarbons containing from 2 through 4 carbon atoms with oxygen or an oxygen-containing gas in such a manner that a critical balance is maintained between temperature, pressure, oxygen, and contact time in a critical environment of reactants, products and temperature gradients in the reaction zone.

It can be seen from the above that there are two co-acting, essential areas in this invention—a critical balance and a critical environment. It cannot be too strongly emphasized that both areas of criticality must exist and cooperate simultaneously in order to direct the oxidation of propane to propylene oxide in good yield and efficiencies. Thus, if the critical balance of temperature, pressure, oxygen and contact time were to exist in an environment other than the critical environment, the process would not be effective. In fact, it could very well be that little or no propylene oxide could be recovered.

The necessity of having a critical balance which co-acts with a critical environment can be very readily appreciated when it is pointed out that in the method of this invention propylene oxide is produced at a temperature which is above the temperature at which propylene oxide is degraded.

The above statement is the main theme or key to the absolute necessity of controlling and maintaining a critical balance in a critical environment. From a hasty first impression it might appear that the novel method of this invention is impossible since it appears to violate practically every known thermodynamic principle. However, such is not the case as will be shown when the correlation between the critical balance and the critical environment are set forth.

The critical environment in this invention comprises two elements; (1) maintaining a condition of substantial homogeneity of reactants and reaction products and (2) maintaining essentially isothermal conditions throughout the entire reaction zone.

As used herein the expression "maintaining a condition of substantial homogeneity of reactants and reaction products in the reaction zone" is intended to mean that the concentration of reactants and reaction products is substantially constant throughout the entire reaction zone. This condition can be accomplished in a variety of ways and is not dependent on, or restricted to, a specific reaction vessel and is accomplished by maintaining the reaction zone in a high degree of turbulence whereby the reactants and reaction products are intimately mixed throughout said reaction zone so that there is substantially no concentration gradient therein. The high degree of turbulence can be readily obtained by stirring the reactants and reaction products with a high speed stirrer or by introducing the reactants under pressure so that sufficient turbulence is achieved or by the use of special nozzles designed to allow the entry of reactants at a high rate of flow or by any combination of the above methods.

The second element of the critical environment is the requirement that the reaction zone be maintained under substantially isothermal condition.

The expression "essentially isothermal" as used herein is intended to mean that the temperature remains essentially constant throughout the entire reaction zone. An isothermal condition can be maintained by removing heat from the reaction zone via heat transfer means or preferably by maintaining a substantially adiabatic condition in the reaction zone. One means of maintaining an adiabatic condition while the reaction zone is isothermal is by adding the feed gases and any recycle gases to the reaction zone at a temperature lower than the reaction temperature in such a manner that the relatively cold incoming gases will intimately mix with all the reactants and reaction products and absorb the heat liberated by the exothermic oxidation reactions, so as to maintain the reaction temperature essentially constant.

As has been previously pointed out, the existence of the critical environment in the instant method is independent of the particular reactor employed. Any suitable reactor can be employed as desired provided the critical environment is maintained therein. It is again stressed that it is the environment which is critical and not the reactor.

Suitable reactors in which the critical environment can be maintained include an ordinary stirred pot, a pot with a venturi mixing nozzle and a double cone reactor. These various reactors are shown in FIGURES 1–3.

FIG. 1 shows a simple autoclave 4 which is equipped with a mechanical stirrer 3. Oxygen is introduced through line 1 and the hydrocarbon feed through line 2. The oxygen and the feed are subjected to a high degree of turbulence so that there is no concentration gradient in the reaction zone 5. The product gases are removed via line 6 and the unreacted materials can be recycled (not shown). Adiabatic and isothermal conditions are maintained by introducing the reactants at a temperature which is lower than the reaction temperature so that the excess exothermic heat of reaction is absorbed.

Figure 2:
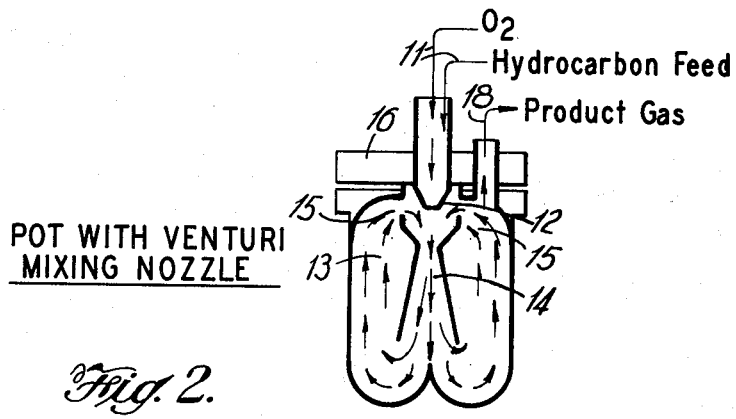
Figure 3:
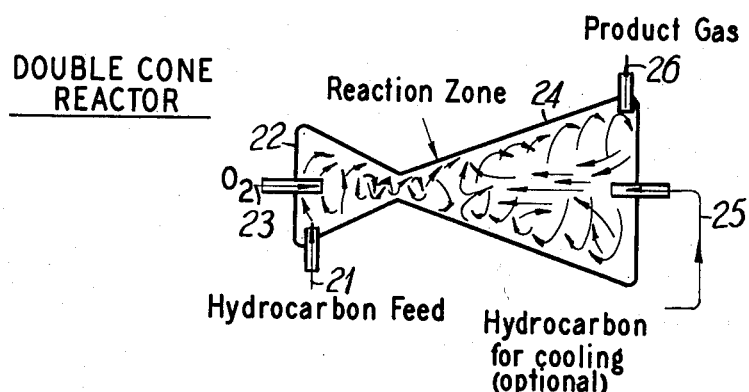

FIG. 2 depicts another reaction vessel which is merely a pot with a venturi mixing nozzle. In this vessel, the gaseous reactants enter the line 11 and pass through nozzle 12 at rate sufficient to give the desired reaction pressure in chamber 13. The gases from nozzle 12 pass rapidly into the duct 14, causing a lower pressure region in the open space between nozzle 12 and duct 14, this open space is designated 15 in the diagram. Duct 14 is supported on the frame 16 by three small supports. This lower pressure region around space 15 causes gases in the chamber to pass into duct 14, thereby mixing the gases in the chamber 13 with incoming gases from inlet line 11. The ratio of gases entering space 15 to gases existing from nozzle 12 can be adjusted by altering the size of the opening in nozzle 12. The specific illustrated reactor is designed to achieve a volume ratio of approximately 20 to 1; i.e., 20 volumes of gas in the chamber mix, with 1 volume of entering gas.

Some of the gases entering open space 15 also pass up the column 17 in counterflow to incoming gases from nozzle 12, and pass out of the reaction region by line 18 to be recovered by suitable means.

By the procedure described it is possible to obtain substantial homogeneity of reactants and reaction products under essentially adiabatic conditions.

As a typical example, if propane is to be oxidized with 12 volume percent oxygen at 500° C. the temperature rise under adiabatic conditions is about 340° C. Therefore, because there is complete homogeneity, and because the oxidation need take place at 500° C., the feed gas need be heated only to 160° C. to attain essentially isothermal and adiabatic conditions.

The reactor illustrated has a volume of 16.7 cubic inches, an inside diameter of 2 inches and a length of 6 inches.

FIG. 3 depicts still another reactor in which the critical environment of this invention can be met. The figure illustrates a double cone reactor. In this reactor two 30°-cones connected at their apexes outline the geometrical shape of the double-cone reactor. The first cone is approximately one-tenth the volume of the second one and serves as the mixing chamber for the oxygen. The preheated feed stream of hydrocarbons is fed tangentially at 21 into the first cone 22 and oxygen is introduced into this rotating body of gases through a side tube 23 axially located at the base of the cone. The centrifugal force causes intimate and instantaneous mixing of the oxygen and the resulting mixture then spins into the second chamber 24 at an extremely high velocity, progressively decelerating as it moves into the space enclosed in the diverging walls of the second cone.

The distribution of the gas velocities in the second chamber of the reactor produces a low pressure zone at the throat or the point of connection of the two cones which causes the gas mixture near the base of the second cone to return to the apex of the cone via a current running axially at the center of the chamber. This reverse flow of gas causes the entire mass of gas to break up into an infinite number of small eddies and both intense mixing and back-mixing are achieved in this section.

The high velocity of the gases through the throat prevents back propagation of the reaction into the first chamber and the reaction zone is completely confined within the second chamber. Auxiliary streams of gases for moderating the reaction can be introduced through the injection tube axially directed from the base of the second cone 25 and the products are withdrawn at line 26.

Figure 4:
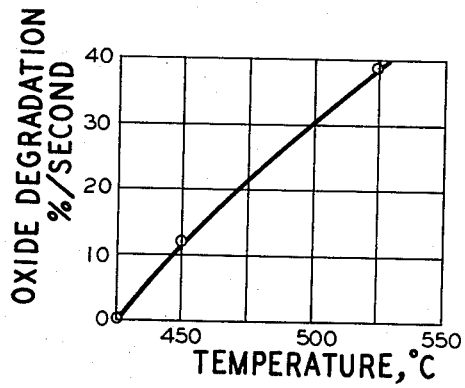

It should become apparent that the critical environment of this invention is one which does not favor the recovery of propylene oxide. Thus, as has been stated, the critical environment consists of substantial homogeneity of reactants and reaction products and essentially isothermal conditions. Thus, under the environment of this invention any propylene oxide formed is intimately mixed with oxygen and should degrade. FIG. 4 shows the degradation of propylene oxide in relation to the temperature. From this graph it can be seen that, at a temperature of 500° C., propylene oxide degrades at a rate of approximately 30 percent per second.

Thus, it would appear absolutely impossible to have a method for maximizing propylene oxide which requires that method to have a critical environment which tends to destroy propylene oxide once it is formed. However, such is not the case. It is again stressed that there are two areas of criticality in the novel method of this invention—a critical balance of variables in a critical environment.

In order to facilitate a better understanding of the necessity for controlling and maintaining the relationship between the critical balance and the critical environment, it is necessary to understand the problems involved in the oxidation of propane to propylene oxide. In such an oxidation two distinct concepts must be kept clear: (1) the amount of propylene oxide which is produced in the reaction zone and (2) the amount of propylene oxide which is recovered in the product stream. Thus, at temperatures of about 500° C. and under homogeneous conditions a comparatively large amount of propylene oxide is formed in the reaction zone. However, due to the presence of excess oxygen and the high temperature, the propylene oxide is further degraded to other products so that the amount of propylene oxide which is recovered in the product stream is comparatively low. Conversely, when the temperature is maintained at about 350° C. and the reaction is conducted under non-homogeneous conditions, less propylene oxide is formed in the reaction zone but very little of the propylene oxide formed is degraded to other products so that more propylene oxide is recovered in the product stream. Thus, at high temperatures, the rate of degradation of the propylene oxide formed is so great (see FIG. 4) that extremely low yields of propylene oxide in the product stream were obtained in the prior art methods.

In view of the above, all the efforts in the prior art were directed to methods which did not provide an environment which favored the maximum production of propylene oxide in the reaction zone because these methods failed to prevent the degradation of propylene oxide once it was formed. In other words, the prior art processes provided environments which favored the stability of any propylene oxide which was formed and not to environments which favored the production of the maximum amount of propylene oxide in the reaction zone.

In view of the above, it can readily be observed that the relation between the critical environment which favors the maximum production of propylene oxide and the critical balance of variables, which effectively prevents the degradation of propylene oxide formed to any substantial degree must be carefully controlled.

As has been previously pointed out, the critical balance of variables involves the careful regulation of temperature, pressure, oxygen concentration and contact time in the reaction zone.

The necessity of regulating the amount of oxygen in the feed has its basis in a twofold consideration—the amount of oxygen present which serves to oxidize propane to propylene oxide and the amount of oxygen present which serves to react with the propylene oxide formed and further oxidizes it to unwanted products.

The above-mentioned twofold consideration only sets forth the necessity of regulating the amount of oxygen and not how to regulate it. In order to arrive at how to regulate the amount of oxygen in the feed, a clear understanding of the process of the oxidation reaction is necessary.

Assuming that all variables in a typical propane oxidation, except the amount of oxygen in the feed, are kept constant, and that the product is withdrawn at certain intervals and the unreacted propane recycled, certain definite conclusions can be reached.

Under the above-mentioned set of facts, as the concentration of oxygen increases in the feed, the yield of propylene oxide, in milligrams, per liter of product gas, also increases. This correlation is not too unexpected since the more oxygen that is present, the more propylene oxide will be present in a liter of product stream. However, as the oxygen concentration increases, the amount of propylene oxide formed per 100 pounds of hydrocarbon consumed decreases. Thus, two distinct relationships are observed. The amount of propylene oxide obtained per liter of product gas is directly proportional to the oxygen concentration and the amount of propylene oxide formed per 100 pounds of hydrocarbon consumed is inversely proportional to the oxygen concentration. Although these two relationships would appear to be contradictory, such is not the case as will be seen once the results are understood.

If propane is oxidized in the presence of excess oxygen, quite a substantial amount of propylene oxide will be present in one liter of the product stream. The reason for this is quite obvious since the presence of excess oxygen will cause more propane to become oxidized. However, there is a vast difference between the amount of propylene oxide obtained per liter of product gas and the efficiency of the oxidation reaction. As has been previously stated, the efficiency, i.e., the pounds of propylene oxide per 100 pounds of hydrocarbon consumed, is inversely proportional to the oxygen concentration. The reason why this is so is that although more propylene oxide is formed per liter of product gas, more of the propane is oxidized to products other than propylene oxide. Additionally, because of the large concentration of oxygen, a substantial amount of the propylene oxide formed in the reaction zone is further oxidized to unwanted by-products. Therefore, it can be seen that, although more propylene oxide is formed per liter of product gas as the oxygen concentration increases, it takes more propane to form this same amount of propylene oxide then it would if a lower oxygen concentration were present.

From the above explanation it can be seen that, in directing the oxidation of propane to a particular oxidation product, a careful balance must be maintained between the amount of propylene oxide which can be recovered from one liter of a product stream and the amount of propylene oxide which is produced from 100 pounds of hydrocarbon. The factors determining just how this balance should be maintained are just as much theoretical as they are economical. Thus, it might be theoretically possible to have an oxygen concentration sufficiently low that the amount of propylene oxide recoverable per liter of product gas would in turn be low, so that the efficiency of the reaction would be high. This conclusion can be reached by considering the correlation of propylene oxide production in relation to oxygen concentration. However, it would be economically undesirable to have too low a concentration of propylene oxide per liter of product gas since it would take many hours to process said product gas to obtain a definite amount of propylene oxide. Conversely, if an oxygen concentration were chosen so that a comparatively large amount of propylene oxide were obtained per liter of product stream, the method would be economically unfeasible since the amount of propane which would be consumed would be economically out of proportion to the propylene oxide which was obtained.

It has now been found that if the oxygen in the feed stream is maintained between 4 to 14 percent by volume of the total feed, a method results which produces propylene oxide in good yields with a high degree of economy. It is particularly preferred to use oxygen concentrations in the range of 6 to 8 percent by volume since at these concentrations the process is maximized from both a theoretical and economical consideration. The following table will illustrate the effect of the oxygen concentration on the production of propylene oxide. In this table experiments have been run under four different sets of conditions. It is to be noted that three examples have been run for each one of the four different sets of conditions. The only variations in conditions between the examples in each set are slight variations in temperature as can be seen from the listing of these temperatures and also a slight variation of propane in the feed. This variation of propane is quite obvious since the oxygen concentration in the feed is increased. Thus, at 8 percent by volume of oxygen in the feed there is two percent less of propane then when the oxygen concentration is 6 percent.

TABLE I

| Example | °C | Volume percent of $O_2$ in feed | Yield of propylene oxide in mg./l. of product gas | Yield of propylene oxide in lbs. per 100 lbs. of $C_3$ hydrocarbons consumed |
|---|---|---|---|---|
| 1 | 493 | 6 | 18.2 | 40.1 |
| 2 | 490 | 8 | 18.9 | 30.0 |
| 3 | 500 | 12 | 35.2 | 30.1 |
| 4 | 500 | 6 | 19.5 | 39.4 |
| 5 | 500 | 8 | 22.8 | 33.2 |
| 6 | 498 | 12 | 35.0 | 29.7 |
| 7 | 501 | 6 | 17.7 | 46.2 |
| 8 | 502 | 8 | 31.7 | 31.9 |
| 9 | 505 | 12 | 34.9 | 29.6 |
| 10 | 503 | 6 | 25.1 | 44.8 |
| 11 | 500 | 8 | 35.5 | 38.7 |
| 12 | 502 | 12 | 37.5 | 27.5 |

As was pointed out in the preceding section, oxygen has a definite effect on the oxidation of propane. However, this effect is proportional to the amount of time in which oxygen is in contact not only with the feed but also with the reaction products. Thus, if a definite concentration of oxygen were present in the feed stream the effect of this oxygen on the direction of the oxidation of propane would have a positive relationship to the amount of time the reactants and the reaction products were in the reaction zone. If one were to keep all the variables in a propane oxidation reaction constant except for the contact time several conclusions can be reached. It would become readily apparent that the concentration of propylene oxide in milligrams per liter of product gas is directly proportional to the contact time. This relationship is very logical and very easily seen since the identical relationship exists as between oxygen concentration and the amount of propylene oxide in the product gas. However, it is at this point that the analogy between contact time and oxygen concentration ceases. It would be expected that at longer contact times the efficiency of the oxidation of hydrocarbons to propylene oxide would decrease. However, such is not the case. The effect of contact time on the efficiency of the reaction is negligible. Thus, it is preferred to carry out the reaction at relatively long contact times since more propylene oxide will be present in the product stream at each definite interval of time and the efficiency of the reaction will not suffer.

Translating the above-mentioned theoretical considerations into actual units of contact time, it has now been found that the objects of this invention can be achieved if the oxidation reaction is carried out when the contact times are from 0.07 to 1.5 seconds. The preferred range is from 0.10 to 0.6 second.

The following table will illustrate the relationship of contact time to the yield of propylene oxide. The table depicts four sets of experiments which were conducted at various conditions within the scope of this invention. The individual experiments in each set were conducted at the same conditions except for the variation in contact times.

TABLE II

| Example | °C. | Time in seconds | Milligrams of propylene oxide per liter of product gas | Lbs. of propylene oxide per 100 lbs. of $C_3$ hydrocarbons consumed |
|---|---|---|---|---|
| 1 | 493 | .07 | 18.2 | 40.1 |
| 4 | 500 | .09 | 19.5 | 39.4 |
| 13 | 501 | .12 | 25.7 | 42.3 |
| 2 | 490 | .07 | 18.9 | 30.0 |
| 5 | 498 | .09 | 22.8 | 33.2 |
| 14 | 492 | .10 | 24.1 | 34.1 |
| 8 | 502 | .12 | 31.7 | 34.8 |
| 15 | 505 | .14 | 33.4 | 31.2 |
| 11 | 500 | .18 | 35.5 | 38.7 |
| 16 | 503 | .36 | 37.8 | 32.4 |
| 17 | 502 | .18 | 37.5 | 18.5 |
| 18 | 500 | .24 | 47.3 | 17.4 |
| 19 | 500 | 0.12 | 24 | 34 |
| 20 | 500 | 0.24 | 35 | 33 |

From the above table it can be seen that the yield of propylene oxide in milligrams per liter of product gas was directly proportional to the contact time, whereas the efficiency remained practically constant in each set of experiments.

Figure 5:
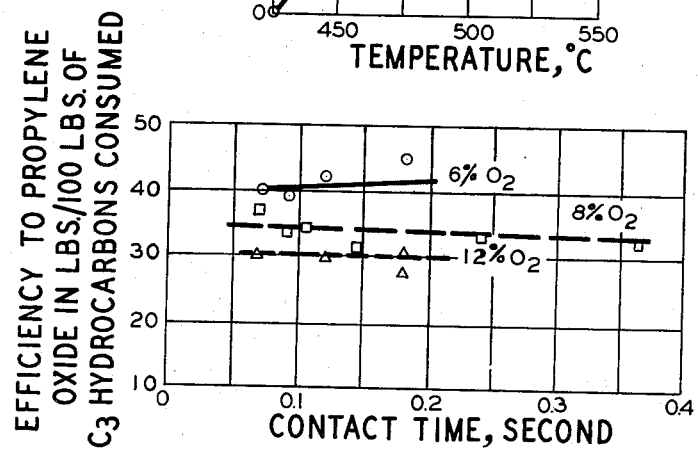

FIG. 5 represents a graph of the contact time versus the efficiency. It can be seen that the efficiency, at each level of oxygen concentration remains almost constant.

Another variable which is part of the critical balance is temperature. As has been previously pointed out, the process of this invention is operated at temperatures which are above the degradation temperature of propylene oxide. Thus, it is absolutely essential that the process of this invention be conducted at temperatures within the range of about 425 to 575° C. The preferred range is from 450–550° C.

Figure 6:
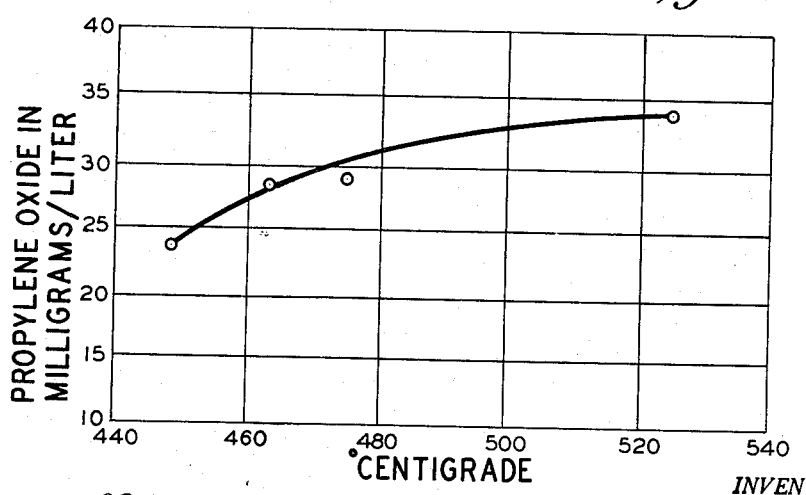
Figure 7:
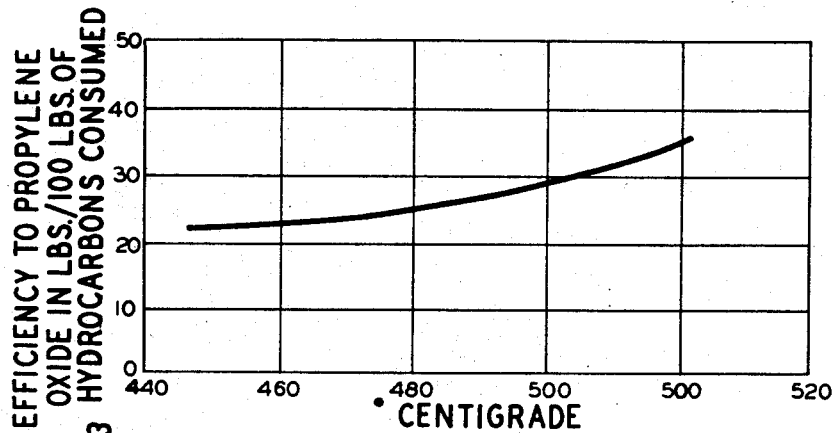

FIG. 6 represents a graph of the yield of propylene oxide per liter of product gas and FIG. 7 shows the relationship of efficiency to temperature. Both these graphs dramatically illustrate the better results obtained as the temperature increases. These graphs are based on experiments conducted in a double cone reactor at a pressure of 45 p.s.i.g., a contact time of 0.12 second and a feed which consisted of:

Percent by volume
Propane _____ 62
Propylene _____ 20
Carbon monoxide _____ 10
Oxygen _____ 8

The last member of the critical balance of variables is the pressure. The exact theory behind the influence of pressure on the direction of the oxidation of hydrocarbons to specific partial oxidation products is not completely understood. However, it has been discovered that all the relationships previously set forth are to no avail unless the oxidation takes place at pressures about 20 to 150 p.s.i.g. The preferred range for the production of propylene oxide is from 30 to 75 p.s.i.g.

It has also been discovered that within the critical range of pressure, the higher the pressure, the poorer the yield of propylene oxide.

Figure 8:
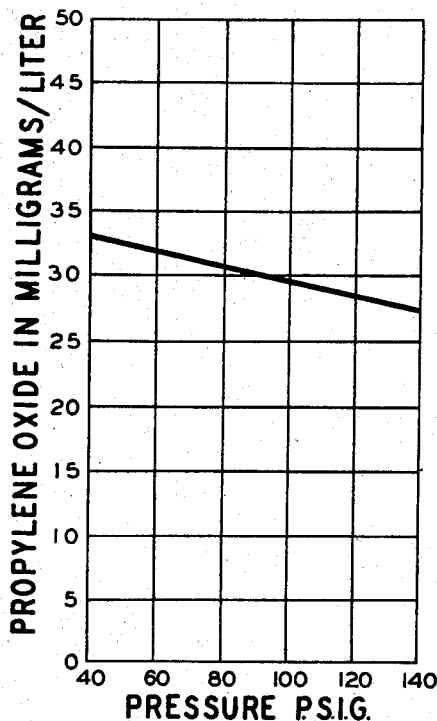
Figure 9:
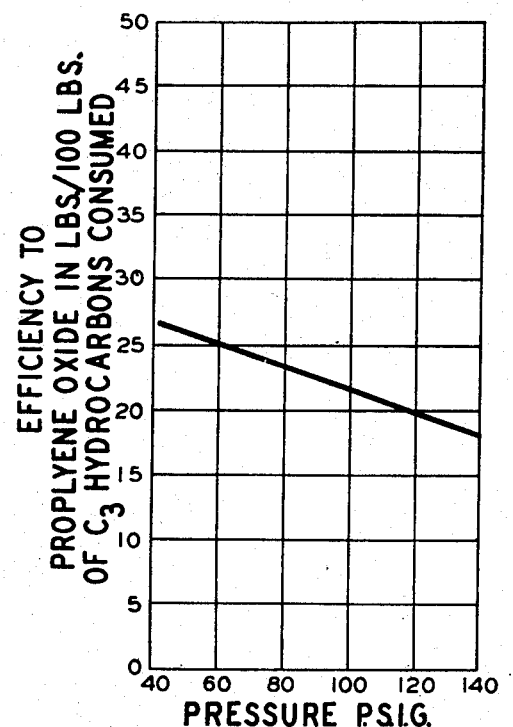

FIGURES 8 and 9 represent graphs on the influence of pressure on the yield and efficiency to propylene oxide. These results were obtained in a double cone reactor having a total volume of 200 cubic centimeters at a temperature of 500° C., a contact time of 0.5 second with a feed composed of:

10 percent carbon monoxide by volume
8 percent oxygen by volume
20 percent propylene by volume
62 percent propane by volume As has been constantly stressed heretofore, the method of this invention requires the maintaining and controlling of a critical balance of variables in a critical environment of the reaction zone. In view of the discussion of these areas of criticality, the above statement can be translated into actual numbers. It is absolutely critical in the process of this invention to operate at a pressure of 20 to 150 p.s.i.g. at a temperature of 425–575° C., at an oxygen concentration of 4–14 percent by volume at a contact time of 0.07 to 2 seconds in a reaction zone in which there is substantial homogeneity of reactants and reaction products and essentially isothermal condition.

As has been stated, the process of this invention is applicable to hydrocarbons which have from 2 to 4 carbon atoms. Although these hydrocarbons can be oxidized alone, it is preferred to add a certain amount of the corresponding olefin to the feed since the results are improved. Thus, when propane is being oxidized to propylene oxide, the addition of some propylene enhances the results. The amount of olefin added can vary over a wide range but it is preferred to employ a mol ratio of saturated hydrocarbon to olefin of from 1:2 to 10:1. The particularly preferred mol ratio is from 3:1 to 4:1.

In another aspect of this invention, it is preferred to incorporate an inert gas into the feed stream. The inert gas serves to aid in controlling the rate of the oxidation in a way which is not completely understood. The gases which can be employed are carbon monoxide, carbon dioxide, nitrogen, helium, etc. The inert gas is used in the amount of about 10 percent by volume of the total feed mixture. The following table will illustrate the results obtained by the addition of propylene and carbon monoxide to the feed in three sets of experiments. The experiments in each set are conducted under similar conditions except for the feed stream.

TABLE III

| Example | °C. | Feed, percent by volume | | | | Propylene oxide in mg./liter of product gas | Propylene oxide in lbs. per 100 lbs. of C₃ hydrocarbons consumed |
| --- | --- | --- | --- | --- | --- | --- | --- |
| | | Propane | Propylene | CO | Oxygen | | |
| 19 | 497 | 88 | 0 | 0 | 12 | 33.5 | 14.9 |
| 20 | 498 | 63 | 25 | 0 | 12 | 62.5 | 26.3 |
| 21 | 499 | 49 | 39 | 0 | 12 | 81.4 | 38.5 |
| 22 | 500 | 18 | 70 | 0 | 12 | 82.0 | 41.7 |
| 23 | 500 | 0 | 88 | 0 | 12 | 81.8 | 43.3 |
| 24 | 445 | 58 | 20 | 10 | 12 | 60.0 | 27.3 |
| 25 | 455 | 62 | 20 | 10 | 8 | 51.7 | 32.9 |
| 26 | 451 | 62 | 20 | 10 | 8 | 29.4 | 29.6 |
| 27 | 472 | 60 | 20 | 10 | 12 | 34.8 | 23.6 |

From the above table it can be seen that both the yield and efficiency of the reaction to propylene oxide increased as the concentration of propylene oxide increased as the concentration of propylene was increased. It can also be seen from Examples 24–25 and 26–27 that increasing the oxygen decreases the efficiency.

Figure 10:
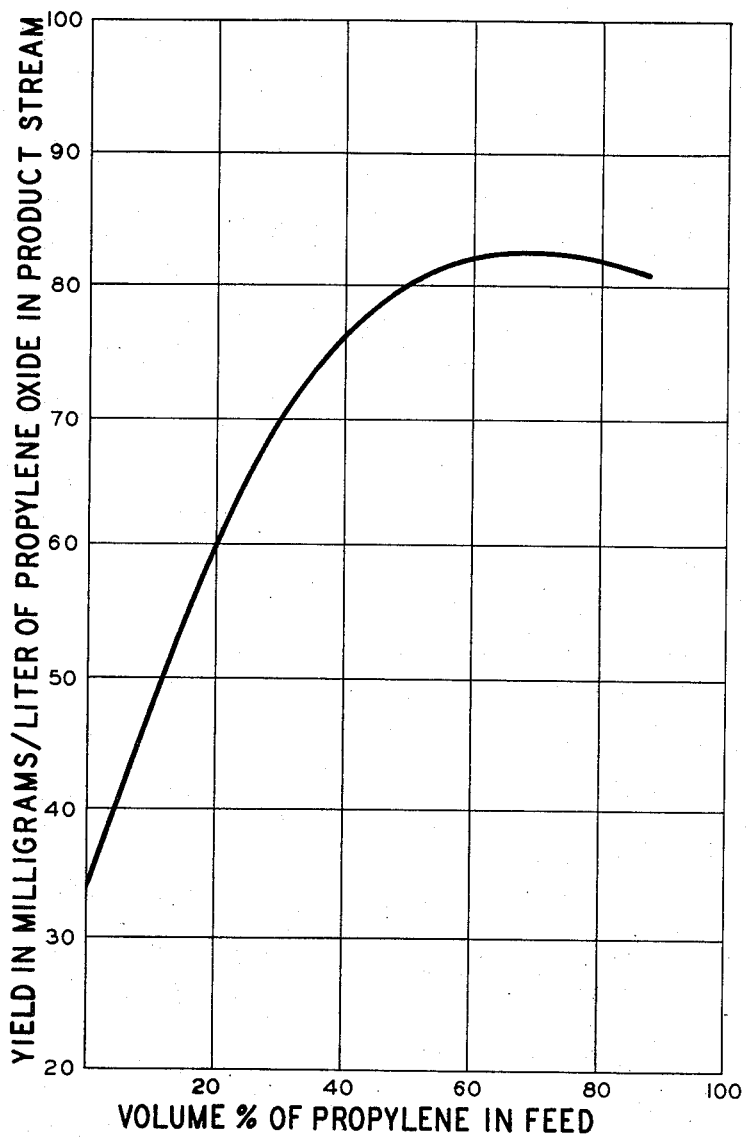
Figure 11:
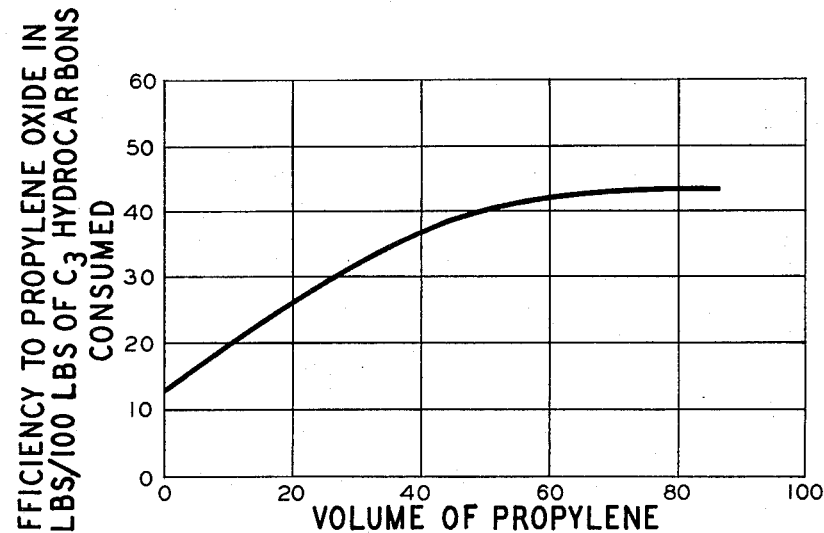

FIGURE 10 and FIGURE 11 are graphs of the yield and efficiency of a propane oxidation to propylene oxide. These graphs are based on experiments conducted in a double cone reactor at a pressure of 45 p.s.i.g., an oxygen concentration of 12 percent by volume, a contact time of 1.2 seconds, and a temperature of 500° C.

Although one of the primary objects of this invention is to provide a method for the direction of the oxidation of propane to propylene oxide to obtain good yields and efficiencies, still another aspect of this invention deals with controlling the yield and efficiency of the oxidation reaction to acetaldehyde.

As has been previously stated there can be many oxidation products when propane is oxidized. Also, it is of the utmost importance to maximize the yield of the desired product. This in itself is not the best answer in arriving at a highly economical process. The reason for this is that some of the unwanted by-products in a propane oxidation are much more easily removed from the product stream than others. One of the most difficult by-products to remove is acetaldehyde. Thus, it would be a tremendous advantage to obtain a process which not only maximizes the yield and efficiency of the reaction to propylene oxide but also decreases the amount of acetaldehyde produced per 100 pounds of hydrocarbons consumed.

The method of this invention can accomplish this result. It is immediately evident that such a result is a tremendous improvement over the prior art.

Figure 12:
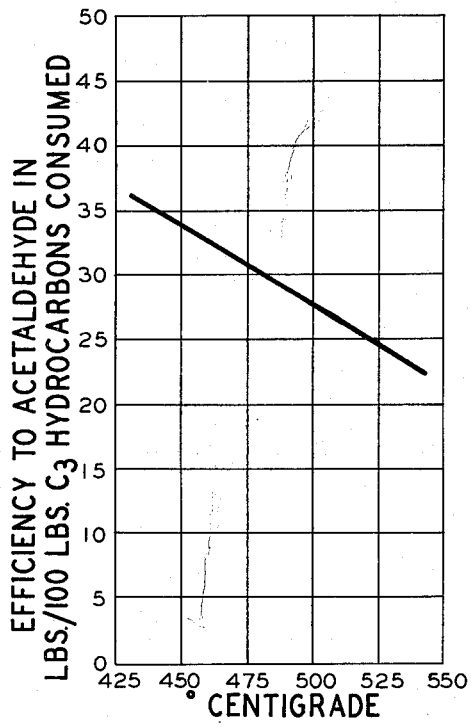

It has now been found that at higher temperatures within the critical temperature range of this invention, efficiency of acetaldehyde decreases. This fact is shown in FIG. 12 where the efficiency of acetaldehyde is plotted against the temperature. This graph was arrived at from experiments conducted in a double cone reactor at a pressure of 45 p.s.i.g., at a contact time of 12 seconds and with a feed composed of:

62 percent of propane by volume
20 percent of propylene by volume
10 percent of carbon monoxide by volume
8 percent of oxygen by volume From this graph it can be seen in this process that operating at temperatures of around 525° C. will not only give a good yield of propylene oxide but will also give this propylene oxide in a process which produces less acetaldehyde than had heretofore been possible.

Figure 13:
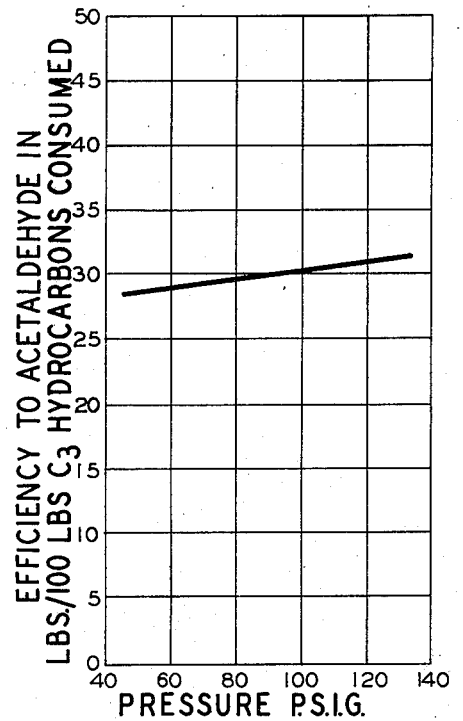

The same effect on acetaldehyde production is observed when the pressure is varied within the critical limits of this invention. At the lower range of pressure the efficiency of the oxidation to acetaldehyde is lower than at the upper range. FIG. 13 depicts a graph of the efficiency of the oxidation reaction to acetaldehyde in relationship to the pressure. From this graph it can be seen why the preferred range of pressure is from 30–75 p.s.i.g.

The following examples will illustrate the novel process of this invention.

*Examples 1–18*

These reactions were conducted in a double cone reactor similar to the one shown in FIG. 3. The volume of the reactor was 35 milliliters. The reaction conditions as well as the results of these examples are shown in Table 4.

*Examples 19–25*

These experiments were conducted in the same manner as Examples 1–18 except that the reactor had a volume of 500 milliliters. Operating conditions and results are also shown in Table IV.

*Examples 26–27*

These experiments were also conducted in the same manner as the preceding experiments except that the reactor had a volume of 125 milliliters. Operating conditions and results are shown in Table IV.

Examples 28–31

These experiments were also conducted in the same manner as the preceding examples except that the reactor had a volume of 200 milliliters. Operating conditions and results are also shown in Table IV.

Examples 32–33

These experiments were conducted in the same manner as Examples 1–18 except that the partial pressure of the reactants was held constant. Operating conditions and results are shown in Table IV.

throughout the reaction zone, thermocouples were placed in positions along the reactor similar to the sampling technique used in Example 34. A total of four thermocouples were used. The temperature was measured at each thermocouple under reaction conditions. It was found that there was no detectable change in temperature anywhere in the reaction zone.

Example 36

Propane was oxidized during single-pass operation in a double cone type of back-mixing reactor to produce

TABLE IV

| Ex. | °C. (A) | Cont. time | P.s.i.g. | Mol percent in feed | | | | Mg./liter of product gas | | | Mol/ hr. | Products in pounds per 100 pounds of $C_3$ hydrocarbons consumed | | | | | | | | | |
|---|---|---|---|---|---|---|---|---|---|---|---|---|---|---|---|---|---|---|---|---|---|
| | | | | $C_3H_8$ | $C_3H_6$ | $O_2$ | CO | $C_3H_6O$ (B) | $CH_3CHO$ (C) | HCHO (D) | | CO | $CO_2$ | $C_3H_6O$ | $CH_3CHO$ | HCHO | $CH_4$ | $C_2$ | $C_4$ | HAC (E) | Ester (F) |
| 1 | 493 | .07 | 45 | 64 | 20 | 6 | 10 | 18.2 | 14.5 | 0.77 | 26.9 | 7.4 | 40.1 | 31.7 | 21.6 | 2.0 | 12.2 | 5 | 1.7 | 3.9 |
| 2 | 490 | .07 | 45 | 62 | 20 | 8 | 10 | 18.9 | 14.2 | 1.11 | 15.3 | 26.2 | 30.0 | 22.8 | 23.6 | 2.7 | 12.7 | 4.4 | 1.3 | 3.8 |
| 3 | 500 | .07 | 45 | 58 | 20 | 12 | 10 | 35.2 | 28.0 | 2.45 | 30.3 | 15.4 | 30.1 | 23.6 | 27.0 | 3.6 | 13.3 | 3.3 | 2.6 | 5.1 |
| 4 | 500 | .09 | 45 | 64 | 20 | 6 | 10 | 19.5 | 11.7 | 0.57 | 20.6 | 25.1 | 39.4 | 24.3 | 17.5 | 3.1 | 12.9 | 4.6 | 1.2 | 3.7 |
| 5 | 498 | .09 | 45 | 62 | 20 | 8 | 10 | 22.8 | 18.6 | 1.04 | 28.9 | 27.4 | 33.2 | 27.1 | 23.4 | 2.0 | 11.3 | 2.0 | 1.8 | 4.5 |
| 6 | 504 | .09 | 45 | 58 | 20 | 12 | 10 | 35.0 | 28.2 | 1.60 | 37.3 | 29.5 | 29.7 | 24.0 | 21.6 | 3.2 | 12.3 | 3.0 | 0.8 | 2.2 |
| 7 | 501 | .12 | 45 | 64 | 20 | 6 | 10 | 17.7 | 13.3 | .46 | 46.2 | 20.6 | 26.6 | 20.2 | 12.7 | 2.9 | 16.1 | 3.4 | 1.1 | 2.8 |
| 8 | 502 | .12 | 45 | 62 | 20 | 8 | 10 | 31.7 | 15.9 | 0.81 | 31.9 | 26.1 | 34.8 | 17.6 | 18 | 4.1 | 13.7 | 4.4 | 1.3 | 3.6 |
| 9 | 505 | .12 | 45 | 58 | 20 | 12 | 10 | 34.9 | 28.3 | 1.55 | 40.9 | 28.2 | 29.6 | 23.7 | 27.8 | 4.0 | 9.3 | 5.4 | 1.8 | 3.7 |
| 10 | 503 | .18 | 45 | 64 | 20 | 6 | 10 | 25.1 | 13.7 | 0.31 | 24.5 | 11.8 | 44.8 | 24.4 | 15.6 | 1.9 | 13.1 | 5.7 | 2.1 | 4.0 |
| 11 | 500 | .18 | 45 | 62 | 20 | 8 | 10 | 35.5 | 17.0 | 0.49 | 24.4 | 23.3 | 38.7 | 18.8 | 18.2 | 4.1 | 14.8 | 6.3 | 0.7 | 5.2 |
| 12 | 502 | .18 | 45 | 58 | 20 | 12 | 10 | 37.5 | 25.3 | 0.83 | 37.3 | 30.5 | 27.5 | 18.5 | 18.7 | 4.1 | 14.1 | 4.6 | 1.4 | 3.7 |
| 13 | 501 | .12 | 45 | 64 | 20 | 6 | 10 | 25.7 | 13.7 | 0.51 | 28.3 | 23.0 | 42.3 | 22.5 | 16.6 | 3.2 | 9.7 | 5.9 | 1.9 | 3.3 |
| 14 | 492 | .10 | 45 | 62 | 20 | 8 | 10 | 24.1 | 17.7 | 1.03 | 28.5 | 17.4 | 34.1 | 25.1 | 25.5 | 2.8 | 9.3 | 4.6 | 1.5 | 5.5 |
| 15 | 505 | .14 | 45 | 62 | 20 | 8 | 10 | 33.4 | 21.2 | 0.86 | 37.0 | 23.8 | 31.2 | 20.0 | 21.3 | 4.4 | 12.5 | 5.0 | 1.5 | 4.5 |
| 16 | 503 | .36 | 45 | 62 | 20 | 8 | 10 | 37.8 | 20.0 | 0.31 | 23.7 | 28.0 | 32.4 | 17.4 | 17.5 | 6.8 | 14.6 | 7.1 | 1.2 | 3.5 |
| 17 | 502 | .18 | 45 | 58 | 20 | 12 | 10 | 37.5 | 25.3 | 0.83 | 37.3 | 30.5 | 27.5 | 18.5 | 18.7 | 4.1 | 14.1 | 4.6 | 1.4 | 3.7 |
| 18 | 500 | .24 | 45 | 58 | 20 | 12 | 10 | 47.3 | 29.0 | .73 | 36.7 | 23.6 | 33.0 | 17.4 | 18.1 | 5.4 | 11.5 | 5.1 | 3.5 | 4.0 |
| 19 | 497 | 1.2 | 45 | 88 | 0 | 12 | 0 | 33.5 | 29.0 | .54 | 22.1 | 4.2 | 14.9 | 12.9 | 3.7 | 20.2 | 40.0 | 0.2 | 0.1 | 0.6 |
| 20 | 498 | 1.2 | 45 | 63 | 25 | 12 | 0 | 62.5 | 39.0 | 0.96 | 28.2 | 5.7 | 26.3 | 16.5 | 6.3 | 11.9 | 26.3 | 1.0 | 0.5 | 1.6 |
| 21 | 499 | 1.2 | 45 | 49 | 39 | 12 | 0 | 81.4 | 45.2 | 1.47 | 38.7 | 4.0 | 38.5 | 21.6 | 11.7 | 4.7 | 21.7 | 3.5 | 1.3 | 3.3 |
| 22 | 500 | 1.2 | 45 | 17 | 70 | 12 | 0 | 82.0 | 55.2 | 1.98 | 42.1 | 10.1 | 41.7 | 28.2 | 16.5 | 0.5 | 13.4 | 0.9 | 1.4 | 4.7 |
| 23 | 500 | 1.2 | 45 | 0 | 88 | 12 | 0 | 81.8 | 63.2 | 2.22 | 35.5 | 8.7 | 43.3 | 35.4 | 19.9 | 3.8 | 9.2 | 6.5 | 1.4 | 4.3 |
| 24 | 445 | 0.9 | 45 | 58 | 20 | 12 | 10 | 60.0 | 28.0 | 1.67 | 37.1 | 10.0 | 27.3 | 12.8 | 8.8 | 12.5 | 22.9 | 6.3 | 1.2 | 2.2 |
| 25 | 455 | 0.9 | 45 | 62 | 20 | 8 | 10 | 51.7 | 22.0 | 1.04 | 29.0 | 10.4 | 32.9 | 14.0 | 7.6 | 14.6 | 19.4 | 7.5 | 0.7 | 2.2 |
| 26 | 451 | 0.15 | 45 | 62 | 20 | 8 | 10 | 29.4 | 40.1 | 3.14 | 35.1 | 12.0 | 29.6 | 40.7 | 22.5 | 3.6 | 1.3 | 7.6 | 1.6 | 5.9 |
| 27 | 472 | 0.15 | 45 | 60 | 20 | 10 | 10 | 34.8 | 44.4 | 3.59 | 42.7 | 13.4 | 23.6 | 30.0 | 17.7 | 2.9 | 5.1 | 6.8 | 1.2 | 3.8 |
| 28 | 500 | 0.5 | 45 | 62 | 20 | 8 | 10 | 32.8 | 21.8 | 1.13 | 27.5 | 15.4 | 26.5 | 17.5 | 12.2 | 7.1 | 21.9 | 9.1 | 3.2 | 3.2 |
| 29 | 500 | 0.5 | 70 | 62 | 20 | 8 | 10 | 32.4 | 21.0 | 1.31 | 22.6 | 8.2 | 22.7 | 14.6 | 10.2 | 21.2 | 20.6 | 8.3 | 2.1 | 3.6 |
| 30 | 500 | 0.5 | 90 | 62 | 20 | 8 | 10 | 29.6 | 25.5 | 1.53 | 40.0 | 5.2 | 23.8 | 18.4 | 10.3 | 11.4 | 16.8 | 7.9 | 2.4 | 3.8 |
| 31 | 500 | 0.5 | 130 | 62 | 20 | 8 | 10 | 27.4 | 29.2 | 2.88 | 37.5 | 8.6 | 19.0 | 20.3 | 14.1 | 10.5 | 16.9 | 7.5 | 3.2 | 3.3 |
| 32 | 500 | 0.18 | 45 | 58 | 20 | 12 | 10 | 37.5 | 25.3 | 0.83 | 37.3 | 30.5 | 27.5 | 18.5 | 18.7 | 4.1 | 14.1 | 4.6 | 1.4 | 3.7 |
| 33 (G) | 500 | 0.18 | 150 | 21.1 | 7.3 | 4.4 | 3.6 | 38.2 | 28.1 | 27.6 | 27.6 | 24.6 | 26.2 | 18.9 | 24.4 | 4.9 | 15.3 | 4.4 | 5.8 | 4.7 |

(A) Temperature measured by thermocouples extending into reaction zone.
(B) Propylene oxide contained in reactor effluent (0° C., 760 mm. Hg), after high boiling products were separated by a water-cooled condenser.
(C) Acetaldehyde contained in reactor effluent (0° C., 760 mm. Hg), after high boiling products were separated by a water-cooled condenser.
(D) Formaldehyde contained in the high boiling products separated by a water-cooled condenser.
(E) Total carbonyl compounds, calculated as formaldehyde contained in the high boiling products separated by a water-cooled condenser.
(F) Total acidic compounds, calculated as acetic acid contained in the high boiling products separated by a water-cooled condenser.
(G) In this experiment 63.6 volume percent nitrogen was added in the feed.

Example 34

ANALYSIS OF PRODUCTS IN THE VENTURI-TYPE REACTION VESSEL

In order to determine the degree of mixing in the back-mixed reactor, a series of experiments were performed and the products in the reaction zone were removed from the reactor at certain points along the reaction zone.

In order to test the homogeneity of the reaction mixture under reaction conditions, propylene, propane, and oxygen were added under conditions suitable for the production of propylene oxide. Samples of the material were taken at four different points in the reactor, two of these points were on either side of the entrance nozzle, and two were at the back of the reactor; these locations were considered optimum for determining the degree of homogeneity of the contents in the reactor. All samples had identical analysis within experimental error thereby demonstrating conclusively that this type reactor provides complete mixing of the reactants and products.

Example 35

DETERMINATION OF TEMPERATURE IN THE VENTURI-TYPE REACTION VESSEL

In order to illustrate homogeneity of temperature propylene oxide and other valuable oxygenated products. The reactor employed had a volume of 0.00123 cubic foot and was similar to that shown in FIG. 3. Propane, propylene, and carbon monoxide were measured by suitable flow meters into a common feed line to result in a mixture composed of 62 vol. percent propane, 20 vol. percent propylene, and 10 vol. percent carbon monoxide. This mixture was fed through a 1 x 36-inch electrically heated tubular type heat exchanger which preheated the gas to approximately 475° C. The preheated gas from the preheater was then fed tangentially through transfer line 21 into the mixing cone 22 of the reactor, where unheated oxygen at approximately 30° C. and amounting to 8 percent of the total reaction mixture was added to this rotating mass of gases through line 23 which was axially located at the base of the cone. The centrifugal force caused intimate and instantaneous mixing of the gases, and the resulting homogeneous mixture passed with a spinning motion into the second (larger) cone 24 where the temperature and the composition of the mixture was sufficient to initiate and sustain the reaction. During this experiment the total feed rate of gases to the reactor was 19.5 cubic feet per hour which corresponds to a residence time of 0.36 second at 45 p.s.i.g. pressure and at a temperature of 500° C. The reaction temperature was controlled by adjusting the temperature of the preheated gases, and by by-passing 10 to 15 percent of the gases from the feed line before the preheater into the second cone of the reactor through line 25.

When the reaction had reached a steady state, the effluent (product gas) leaving the reactor through line 26 was cooled to approximately 40° C. as it passed through a series of water-cooled condensers into a trap which removed relatively the high-boiling products which included formaldehyde in the form of a hydrate. The remaining gases containing most of the desired products were measured by a gas meter and analyzed by chemical means and by a vapor-phase chromatograph. These analyses indicated a yield of propylene oxide amounting to 38 milligrams per liter of reactor effluent which was obtained at an efficiency of 32 pounds per 100 pounds of propane consumed. The yield of acetaldehyde was 30 milligrams per liter obtained at an efficiency of 17 pounds per 100 pounds of propane consumed.

Temperature measurements, made from thermocouples extending into various points within the reaction zone of the reactor, show variations of no more than 5 to 7° C. This indicates the reaction to be homogeneous in nature and that back-mixing was accomplished within the reactor. The back-mixing results from the entrance of the gas mixture into the space enclosed in the diverging walls of the cone. A low-pressure zone is thereby created near the apex of the cone and it causes the gas mixture near the base to return toward the apex via a current running axially at the center of the chamber. Thus, the reverse flow of gases causes the entire mass of gases to break up into an infinite number of small eddies and both intense mixing and back-mixing are achieved in this cone.

*Example 37*

VENTURI-TYPE REACTOR

The well-insulated reactor, corresponding to that shown in FIGURE 2 had a volume of 3,540 cc. and the initial reaction temperature was obtained by preheating the inlet gas to such a temperature (approx. 400° C.) that the oxidation reaction was initiated. No external heating of the reactor was necessary. Once operating conditions had been attained, the preheater temperature was lowered in proportion to the heat produced by the reaction. In recycle operation, the product gases, after cooling and scrubbing to separate products and by-products was mixed with fresh propane and propylene, and the enriched hydrocarbon feed, together with oxygen, was preheated to 320° C. before introduction into the reactor.

The reaction was carried out at 525° under substantially adiabatic conditions and essentially isothermal conditions, by maintaining a balance of volume of inlet gas (at 320° C.) such that the heat capacity of the cooler gas balanced the heat evolved in the exothermic reaction. To maintain these conditions, the inlet gas was mixed in the venturi mixer with approximately eight times its volume of reacting gases (at approximately 525° C.) in about one-tenth of the total residence time in the reactor. The reaction temperature was maintained by these means at 525°±12° C.

The product gas mixture was cooled quickly to room temperature; the condensable by-products were separated in a trap, at room temperature, and the desired reaction products were removed in a water scrubber. The scrubbed off-gas was partially blown off to maintain the system pressure at 45 p.s.i.g.

The product gas contained, in addition to unreacted feed gas components, 1.39 volume percent total epoxide, 36.0 mg./l.; and 0.81 volume percent total aldehyde, 15.9 mg./l. as determined by conventional analytical procedures. This corresponds to the following efficiencies:

26.8 lb. propylene oxide; 100 lb. of $C_3$ hydrocarbon converted 11.8 lb./aldehyde/100 lb. of $C_3$ hydrocarbon converted at a 13.6% conversion of hydrocarbon per pass.

The feed gas composition, after make-up was:

| Component— | Volume percent |
|---|---|
| Oxygen | 8.7 |
| Carbon monoxide | 11.0 |
| Propylene | 17.1 |
| Propane | 52.6 |
| Methane, ethane, ethylene, carbon dioxide and other gaseous by-products | 10.6 |

The cycle gas volume, as determined after the traps to remove condensables and before the water scrubber, was 1,084 s.c.f.h. (at 21° C.), and the pressure drop through the nozzle of the venturi was 18 p.s.i.g.

*Example 38*

Figure 14:
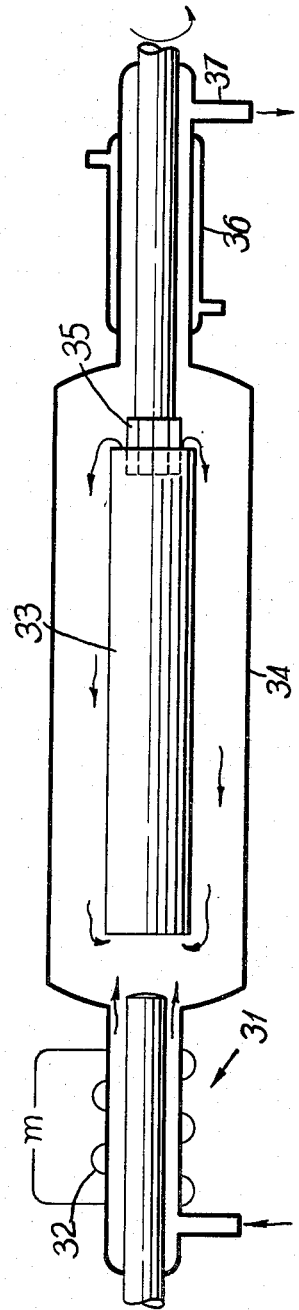

A horizontally disposed mechanically stirred reactor which has been shown in FIG. 14 (not drawn to scale) was constructed from a 3-inch section of 4-inch diameter, No. 316 stainless steel pipe 34 in which was axially disposed a 2-inch diameter pipe 33 enclosing a 2-inch diameter radial blower 35 operated at 3450 r.p.m. The reactor 34 had a volume of 390 cc. Feed gases entered the reactor through an annular preheater 31 designed to give a high preheating rate; the preheater was heated by means of electrical resistance winding 32. The feed gas was introduced into the reactor where the relatively large volume of gas in the reactor under circulating conditions resulted in extremely rapid mixing so that the composition of the gas mixture at the reactor inlet was very nearly that of the product gas stream. Thus, there existed a steady state gas composition in the reactor.

The reaction zone was maintained at 475°±3° C. by control of the exothermic reaction through regulating the temperature of the inlet gas. The reactor pressure was 25 p.s.i.g., the contact time was 0.84 second, and the circulation rate of gas in the reactor was 420 cubic ft./hr.

The crude reaction product was cooled 36 before being passed 37 to traps to remove condensable by-products; then the gases were released by a back pressure controller, measured, analyzed, and then vented. The gaseous product, after passing through the traps, showed the following composition, by conventional methods of analysis:

Propylene oxide, 0.68 volume percent of 15.0 mg./l.
Aldehyde, 0.42 volume percent or 8.3 mg./l.; at a $C_3$ hydrocarbon conversion of 2.5% per pass Feed gas composition:

| Component— | Volume percent |
|---|---|
| Oxygen | 6.7 |
| Carbon monoxide | 26.1 |
| Propylene | 26.2 |
| Propane | 40.5 |
| Methane, ethylene, and ethane | 0.5 |

The efficiencies of this experiment were:

Propylene oxide _____ 42.6 lbs./100 lbs. of $C_3$ hydrocarbons.
Acetaldehyde _____ 25.9 lbs./100 lbs. of $C_3$ hydrocarbons.

*Example 39*

Ethane was oxidized during single-pass operation in a double cone type of back-mixing reactor to produce ethylene oxide and other valuable oxygenated products. The reactor employed had a volume of 0.00123 cubic foot and was similar to that shown in FIG. 3. Ethane, ethylene, and carbon monoxide were measured by suitable flow meters into a common feed line to result in a mixture composed of 62 vol. percent ethylene and 10 vol. percent carbon monoxide. This mixture was fed through a 1 x 36-inch electrically heated tubular type heat exchanger which preheated the gas to approximately 475° C. The preheated gas from the preheater was then fed tangentially through transfer line 21 into the mixing cone 22 of the reactor, where unheated oxygen at approximately 30° C. and amounting to 8 percent of the total reaction mixture was added to this rotating mass of gases through line 23 which was axially located at the base of the cone. The centrifugal force caused intimate and instantaneous mixing of the gases, and the resulting homogeneous mixture passed with a spinning motion into the second (larger) cone 24 where the temperature and the composition of the mixture was sufficient to initiate and sustain the reaction. During this experiment the total feed rate of gases to the reactor was such as as to provide a residence time of 0.5 second at 45 p.s.i.g. pressure and at a temperature of 500° C. The reaction temperature was controlled by adjusting the temperature of the preheated gases, and by by-passing 10 to 15 percent of the gases from the feed line before the preheater into the second cone of the reactor through line 25.

When the reaction had reached a steady state, the effluent (product gas) leaving the reactor through line 26 was cooled to approximately 40° C. as it passed through a series of water-cooled condensers into a trap which removed relatively the high-boiling products which included formaldehyde in the form of a hydrate. The remaining gases containing most of the desired products were measured by a gas meter and analyzed by chemical means and by a vapor-phase chromatograph. These analyses indicated a yield of ethylene oxide amounting to 9.5 milligrams per liter of reactor effluent which was obtained at an efficiency of 20.9 pounds per 100 pounds of hydrocarbon consumed. The yield of aldehyde was 7.4 milligrams per liter obtained at an efficiency of 16.5 pounds per 100 pounds of hydrocarbon consumed.

*Examples 40–43*

These experiments were carried out in a similar manner as Example 34. Operating conditions and results are shown in Table V.

TABLE V

| Ex. | °C. | Cont. time | P.s.i.g. | Volume percent in feed | | | | Product conc. | | | Products in lbs./100 lbs. of $C_2$ hydrocarbons consumed | | | | | | | | | |
|---|---|---|---|---|---|---|---|---|---|---|---|---|---|---|---|---|---|---|---|---|
| | | | | $C_2H_6$ | $C_2H_4$ | $O_2$ | CO | $C_2H_4O$, mg./l. | Ald., mg./l. | HCHO, mol./hr. | CO | $CO_2$ | $C_2H_4O$ | Ald. | HCHO | $CH_4$ | $C_3$ | $C_4$ | HAC | Ester |
| 40 | 450 | 0.5 | 45 | 62 | 20 | 8 | 10 | 8.4 | 8.2 | 1.41 | 80.4 | 18.9 | 13.9 | 13.5 | 33.3 | 5.5 | 3.9 | 2.2 | 3.2 | 6.5 |
| 41 | 450 | 0.5 | 45 | 72 | 20 | 8 | 0 | 8.8 | 8.8 | 1.76 | 61.0 | 12.6 | 15.3 | 14.0 | 41.0 | 2.4 | 5.2 | 2.4 | 4.2 | 9.7 |
| 42 | 500 | 0.5 | 45 | 72 | 20 | 8 | 0 | 11.9 | 7.5 | 1.19 | 47.2 | 28.4 | 21.6 | 13.4 | 31.1 | 7.7 | 8.0 | 3.1 | 7.8 | 7.3 |
| 43 | 525 | 0.5 | 45 | 72 | 20 | 8 | 0 | 15.3 | 7.2 | 1.00 | 46.2 | 30.8 | 24.0 | 11.3 | 21.4 | 13.0 | 6.6 | 3.9 | 6.5 | 6.0 |

What is claimed:

1. A method for the oxidation of hydrocarbons selected from the class consisting of ethane, propane, and butane, to produce the corresponding olefin oxide, which method comprises:
    (a) introducing into a reaction zone a feed mixture consisting essentially of at least one of said hydrocarbons and from 4 to 14 percent by volume of oxygen based on the volume of said hydrocarbon,
    (b) adjusting the rate of said feed so as to maintain a contact time of from 0.07 to 1.5 second in the reaction zone,
    (c) maintaining said reaction zone at a pressure of from 20 to 150 p.s.i.g. and at essentially isothermal condition within the range of 425 to 575° C.,
    (d) maintaining said reaction zone under such condition of intermixing of the reactants and the reaction products that the concentrations of said reactants and reaction products remain substantially constant throughout said reaction zone, and
    (e) recovering the reaction products from said reaction zone.

2. A method for the oxidation of hydrocarbons selected from the class consisting of ethane, propane, and butane, to produce the corresponding olefin oxide, which method comprises:
    (a) introducing into a reaction zone a feed mixture consisting essentially of at least one of said hydrocarbons, from 4 to 14 percent by volume of oxygen based on the volume of said hydrocarbon, and an inert gas,
    (b) adjusting the rate of said feed so as to maintain a contact time of from 0.07 to 1.5 seconds in the reaction zone,
    (c) maintaining said reaction zone at a pressure of from 20 to 150 p.s.i.g. and at essentially isothermal condition within the range of 425 to 575° C.,
    (d) maintaining said reaction zone under such condition of intermixing of the reactants and the reaction products that the concentrations of said reactants and reaction products remain substantially constant throughout said reaction zone, and
    (e) recovering the reaction products from said reaction zone.

3. A method for the oxidation of hydrocarbons selected from the class consisting of ethane, propane, and butane to produce the corresponding olefin oxide which method comprises:
    (a) introducing into a reaction zone a feed mixture consisting essentially of at least one of said hydrocarbons and from 4 to 14 percent by volume of oxygen based on the volume of said hydrocarbon,
    (b) adjusting the rate of said feed so as to maintain a contact time of from 0.07 to 1.5 seconds in the reaction zone,
    (c) maintaining said reaction zone at a pressure of from 20 to 150 p.s.i.g. and at essentially isothermal condition within the range of 425 to 575° C.,
    (d) maintaining said reaction zone under condition of intermixing of the reactants and the reaction products that the concentrations of said reactants and reaction products remain substantially constant throughout said reaction zone,
    (e) continuously recycling any unreacted hydrocarbons back into said feed so that said feed mixture enters the reaction zone at a temperature which is sufficiently lower than the reaction temperature so as to maintain substantially adiabatic condition in the reaction zone, and
    (f) recovering the reaction products from said reaction zone.

4. The method of claim 3 wherein the contact time is from 0.10 to 0.6 second, the temperature of the reaction zone is from 450 to 550° C., the pressure is from 30 to 75 p.s.i.g. and the amount of oxygen in the feed is from 6 to 8 percent by volume.

5. A method for the oxidation of hydrocarbons selected from the class consisting of ethane, propane, and butane to produce the corresponding olefin oxide which method comprises:
    (a) introducing into a reaction zone a feed mixture consisting essentially of at least one of said hydrocarbons, from 4 to 14 percent by volume of oxygen based on the volume of said hydrocarbon, and an inert gas,
    (b) adjusting the rate of said feed so as to maintain a contact time of from 0.07 to 1.5 seconds in the reaction zone,
    (c) maintaining said reaction zone at a pressure of from 20 to 150 p.s.i.g. and at essentially isothermal condition within the range of 425 to 575° C.,
(d) maintaining said reaction zone under such condition of intermixing of the reactants and the reaction products that the concentrations of said reactants and reaction products remain substantially constant throughout said reaction zone,
(e) continuously recycling any unreacted hydrocarbons back into said feed so that said feed mixture enters the reaction zone at a temperature which is sufficiently lower than the reaction temperature so as to maintain substantially adiabatic condition in the reaction zone, and
(f) recovering the reaction products from said reaction zone.

6. A process for the oxidation of hydrocarbons selected from the class consisting of ethane, propane, and butane to the corresponding olefin oxide which process comprises:
(a) introducing into a reaction zone a feed mixture consisting essentially of at least one of said hydrocarbons, an olefin which has the same number of carbon atoms as the corresponding hydrocarbon and oxygen,
(b) adjusting the rate of said feed so as to maintain a contact time of from 0.07 to 1.5 seconds in the reaction zone,
(c) maintaining said reaction zone at a pressure of from 20 to 150 p.s.i.g. and at essentially isothermal condition within the range of 425 to 575° C.,
(d) maintaining a ratio of said hydrocarbon to said olefin in the feed of from 1:2 to 10:1 and an oxygen concentration of from 4 to 14 mol percent of the entire feed,
(e) maintaining said reaction zone under such condition of intermixing of the reactants and the reaction products that the concentrations of said reactants and reaction products remain substantially constant throughout said reaction zone, and
(f) recovering the reaction products from said reaction zone.

7. A process for the oxidation of hydrocarbons selected from the class consisting of ethane, propane, and butane to the corresponding olefin oxide which process comprises:
(a) introducing into a reaction zone a feed mixture consisting essentially of at least one of said hydrocarbons, an olefin which has the same number of carbon atoms as the corresponding hydrocarbon and oxygen,
(b) adjusting the rate of said feed so as to maintain a contact time of from 0.07 to 1.5 seconds in the reaction zone,
(c) maintaining said reaction zone at a pressure of from 20 to 150 p.s.i.g. and at essentially isothermal condition within the range of 425 to 575° C.,
(d) maintaining a ratio of said hydrocarbon to said olefin in the feed of from 1:2 to 10:1 and an oxygen concentration of from 4 to 14 mol percent of the entire feed,
(e) maintaining said reaction zone under such condition of intermixing of the reactants and the reaction products that the concentrations of said reactants and reaction products remain substantially constant throughout said reaction zone, and
(f) recovering the reaction products from said reaction zone.

8. The process of claim 7 wherein the contact time is from 0.10 to 0.6 second, the temperature of the reaction zone is from 450 to 550° C., the mol ratio of hydrocarbon to olefin is from 3:1 to 4:1 and the amount of oxygen in the feed is from 6 to 8 percent.

9. A process for the oxidation of propane to propylene oxide which comprises:
(a) introducing into a reaction zone a feed mixture consisting essentially of propane and from 4 to 14 percent by volume of oxygen based on the volume of said propane,
(b) adjusting the rate of said feed so as to maintain a contact time of from 0.07 to 2 seconds,
(c) maintaining said reaction zone at a pressure of from 20 to 150 p.s.i.g. and at essentially isothermal condition within the range of 425 to 575° C.,
(d) maintaining said reaction zone under such condition of intermixing of the reactants and the reaction products that the concentrations of said reactants and reaction products remain substantially constant throughout said reaction zone, and
(e) recovering the reaction products from said reaction zone.

10. A process for the oxidation of propane to propylene oxide which comprises:
(a) introducing into a reaction zone a feed mixture consisting essentially of propane and from 4 to 14 percent by volume of oxygen based on the volume of propane,
(b) adjusting the rate of said feed so as to maintain a contact time of from 0.07 to 1.5 seconds in the reaction zone,
(c) maintaining said reaction zone at a pressure of from 20 to 150 p.s.i.g. and at essentially isothermal condition within the range of 425 to 575° C.,
(d) maintaining said reaction zone under such condition of intermixing of the reactants and the reaction products that the concentrations of said reactants and reaction products remain substantially constant throughout said reaction zone,
(e) continuously recycling any unreacted hydrocarbons back into said feed so that said feed mixture enters into the reaction zone at a temperature which is sufficiently lower than the reaction temperature so as to maintain substantially adiabatic condition in the reaction zone, and
(f) recovering the reaction products from said reaction zone.

11. The process of claim 10 wherein the contact time is from 0.10 to 0.6 second, the temperature of the reaction zone is from 450 to 550° C., the pressure is from 30 to 75 p.s.i.g. and the amount of oxygen in the feed is from 6 to 8 percent by volume.

12. A process for the oxidation of propane to propylene oxide which comprises:
(a) introducing into a reaction zone a feed mixture consisting essentially of propane, propylene, and oxygen,
(b) adjusting the rate of said feed so as to maintain a contact time of from 0.07 to 1.5 seconds in the reaction zone,
(c) maintaining said reaction zone at a pressure of from 20 to 150 p.s.i.g. and at essentially isothermal condition within the range of 425 to 575° C.,
(d) maintaining a ratio of said hydrocarbon to said olefin of from 1:2 to 10:1 and an oxygen concentration of from 4 to 14 percent by volume of the entire feed,
(e) maintaining said reaction zone under such condition of intermixing of the reactants and the reaction products that the concentrations of said reactants and reaction products remain substantially constant throughout said reaction zone,
(f) continuously recycling any unreacted propane back into the feed so that said feed mixture enters the reaction zone at a temperature which is sufficiently lower than the reaction temperature so as to maintain substantially adiabatic condition in the reaction zone, and
(g) recovering the reaction products from said reaction zone.

(References on following page)

References Cited in the file of this patent

UNITED STATES PATENTS

| | | |
|---|---|---|
| 1,911,746 | Burke et al. | May 30, 1933 |
| 1,995,991 | Lenher | Jan. 9, 1935 |
| 2,365,851 | Thomas | Dec. 26, 1944 |
| 2,367,169 | Gardner | Jan. 9, 1945 |
| 2,530,509 | Cook | Nov. 21, 1950 |
| 2,615,921 | Dougherty et al. | Oct. 28, 1952 |
| 2,725,344 | Fenske et al. | Nov. 29, 1955 |
| 2,775,510 | Gardner et al. | Dec. 25, 1956 |
| 2,775,601 | Gardner et al. | Dec. 25, 1956 |
| 2,820,096 | Steitz | Jan. 5, 1960 |
| 2,981,747 | Lang et al. | Apr. 25, 1961 |

OTHER REFERENCES

Satterfield et al.: Industrial and Engineering Chemistry, vol. 46, No. 5 (May 1954), pp. 1001–1007 (pp. 1001–1002 relied on).

Jones et al.: Ind. & Eng. Chem., vol. 51, pp. 262, 263, 266 (1959).

UNITED STATES PATENT OFFICE
CERTIFICATE OF CORRECTION

Patent No. 3,132,156                                            May 5, 1964

Russel C. Lemon et al.

It is hereby certified that error appears in the above numbered patent requiring correction and that the said Letters Patent should read as corrected below.

Column 2, lines 16 to 22, the reactions should appear as shown below instead of as in the patent:

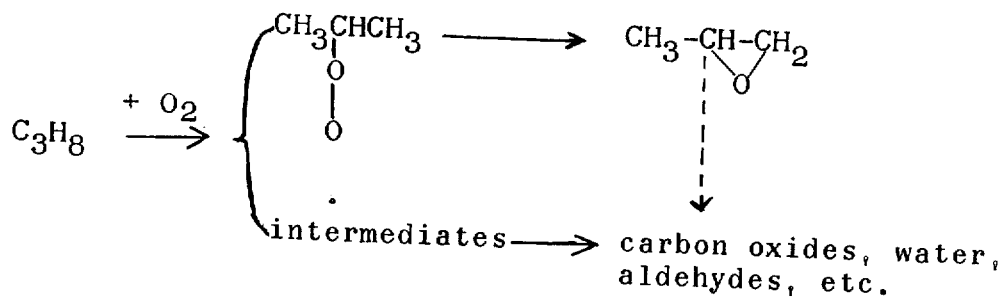

Signed and sealed this 29th day of September 1964.

(SEAL)
Attest:

ERNEST W. SWIDER
Attesting Officer                                     EDWARD J. BRENNER
                                                           Commissioner of Patents